May 26, 1942.   N. E. MORRISON   2,284,336
BORING MACHINE
Filed April 26, 1941   4 Sheets-Sheet 1

Noah E. Morrison INVENTOR
BY Victor J. Evans & Co.
ATTORNEYS

May 26, 1942.  N. E. MORRISON  2,284,336
BORING MACHINE
Filed April 26, 1941  4 Sheets-Sheet 2
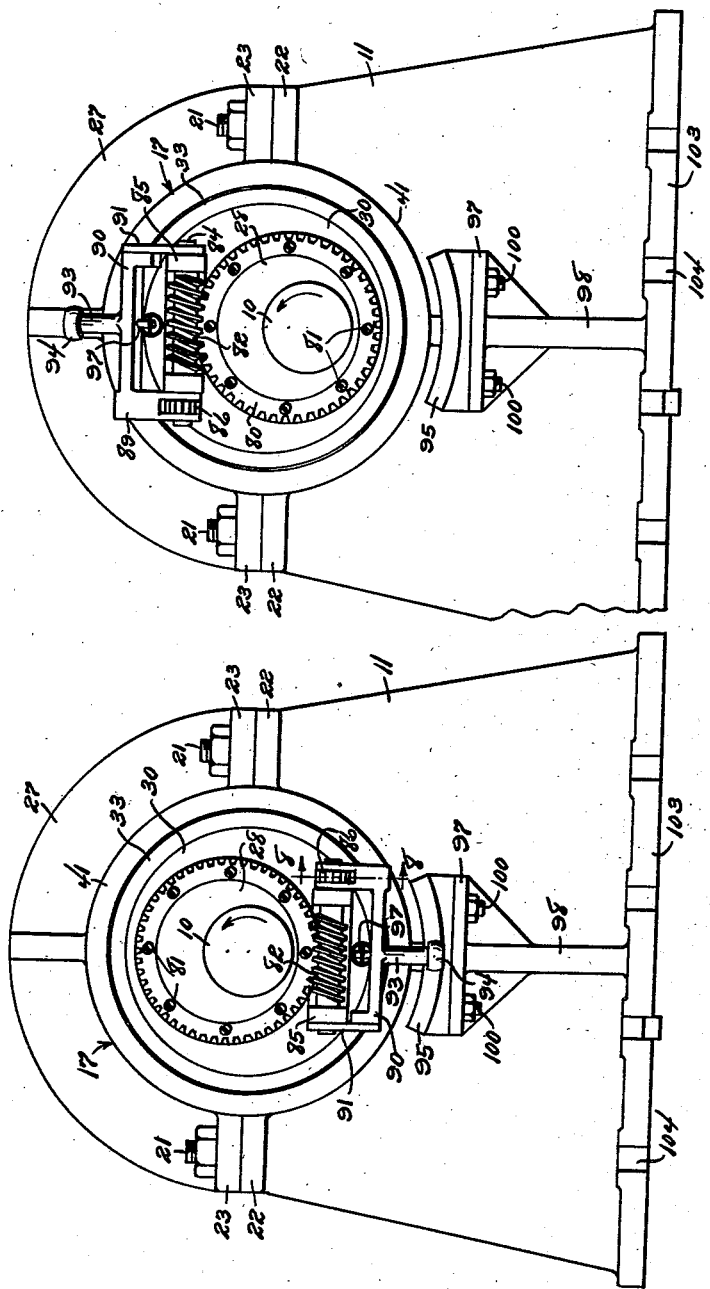
Noah E. Morrison INVENTOR
BY Victor J. Evans & Co.
ATTORNEYS

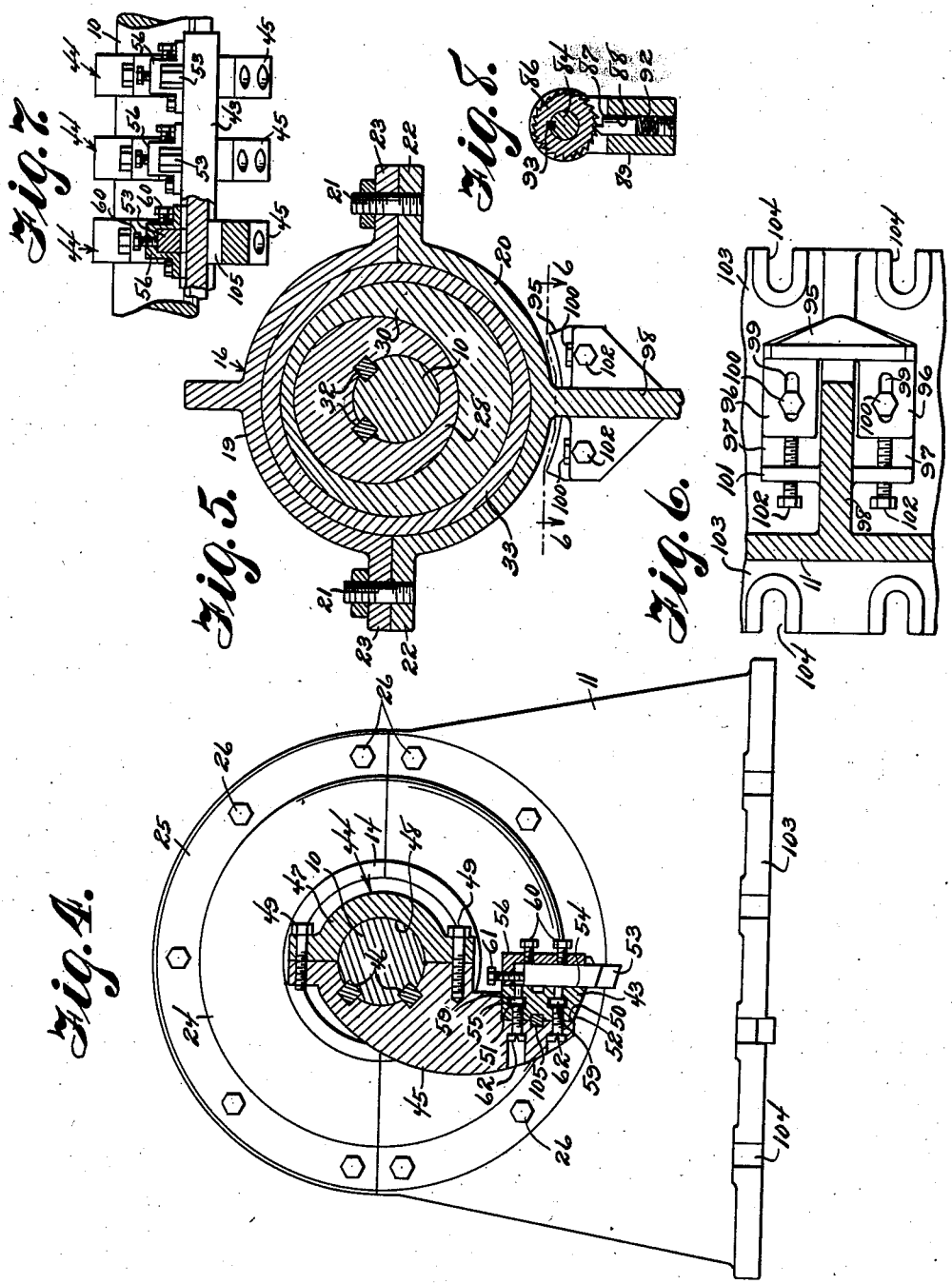

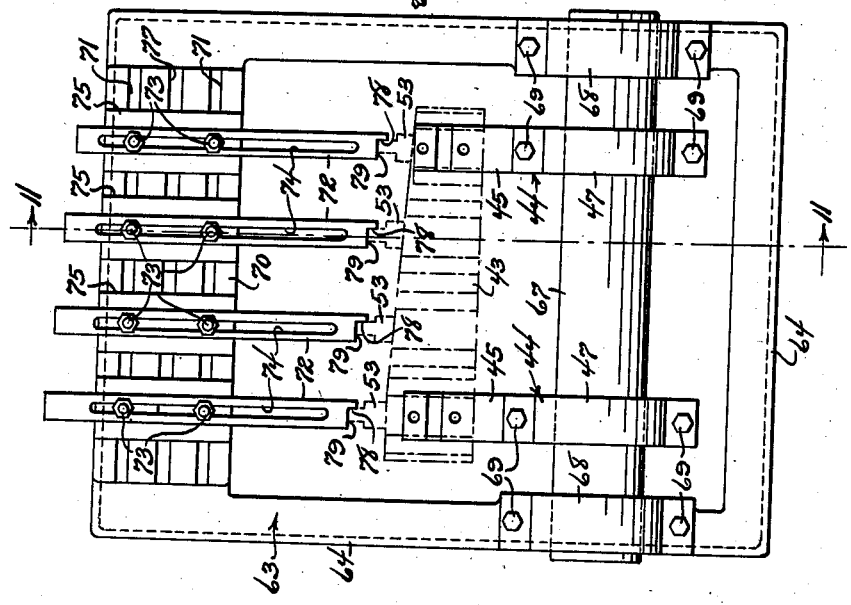

Patented May 26, 1942

2,284,336

UNITED STATES PATENT OFFICE 2,284,336

BORING MACHINE

Noah E. Morrison, Prospect Park, Pa.

Application April 26, 1941, Serial No. 390,617

11 Claims. (Cl. 77—1)

My invention relates to the art of boring turbine casings and the like, and includes among its objects and advantages the provision of an improved boring machine.

An object of my invention is to provide a boring machine having a novel tool action capable of performing a series of boring operations simultaneously inside a turbine casing, in which novel means are incorporated for automatically adjusting the tools radially as a function of tool rotation, and in which means are provided for facilitating accurate boring of a series of stepped diameters.

A further object of my invention is to provide a boring machine having facilities for effectively supporting a turbine casing, for example, in which the machine embodies a novel tool action for boring variable diameters inside the casing, and in which the machine includes a novel tool adjusting mechanism in the nature of a rotary mount for the boring bar to which the boring tools are attached.

Another object is to provide a machine having a series of tools for boring a series of diameters inside a turbine casing, for example, in which the machine serves as a mount for the work, and in which a novel tool setting jig is employed for presetting the tools on the boring bar before the turbine casing is placed in position on the machine.

In the accompanying drawings:

Figure 2 is an end elevational view illustrating one position of the boring bar;

Figure 3 is a view similar to Figure 2 but illustrating the boring bar in another position;

Figure 4 is a sectional view taken along the line 4—4 of Figure 1;

Figure 5 is a sectional view taken along the line 5—5 of Figure 1;

Figure 6 is a sectional view taken along the line 6—6 of Figure 5;

Figure 7 is a view of some of the tools and their respective boring bar mounts, with one mount shown in section;

Figure 8 is a sectional view along the line 8—8 of Figure 2;

Figure 9 is a plan view of the tool setting jig;

Figure 10 is a side view of the jig;

Figure 11 is a sectional view taken along the line 11—11 of Figure 9; and

Figure 12 is an end view of the jig.

Figure 1:
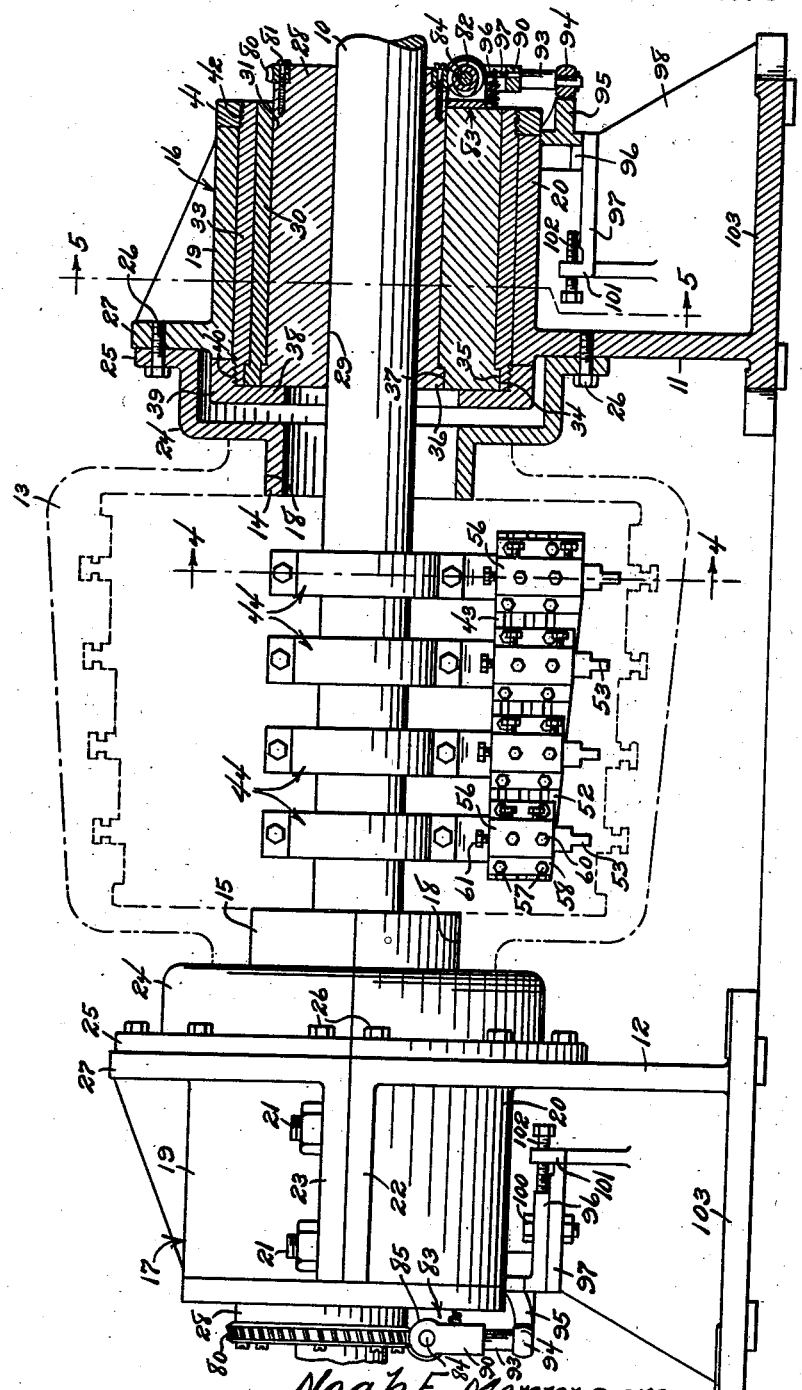
Figure 1 is a side elevational view of my invention, with certain parts broken away for the purpose of illustration, and a turbine casing illustrated generally in dotted lines and in position on the machine.

In the embodiment selected to illustrate the invention, the boring bar 10 is supported by two stands 11 and 12, these stands and their associated structures being identical in construction and operation so that the description of one hereafter will also apply to the other. A turbine casing to be bored is indicated generally in dotted lines 13. This casing is mounted on necks 14 and 15 of cam housings 16 and 17 respectively located at the upper ends of the stands 11 and 12. While the necks 14 and 15 project into openings 18 in the casing 13, such casings are split and may be bolted together after placement on the necks.

Each cam housing 16 and 17 includes sections 19 and 20; the latter being cast integrally with its respective stand, while the section 19 is made secure by stud bolts 21 secured in the flange 22 of the section 20 and passing through corresponding openings in the flange 23 on the section 19. The necks 14 and 15 are respectively cast integrally with cup-like plates 24 having flanges 25 bolted at 26 to the flanges 27 of the respective housings 16 and 17. Both plates 24 and the necks 14 and 15 are split in conformity with the respective housings.

In Figures 1 and 5, a feed cam 28 is bored eccentrically at 29 to fit the boring bar 10. A second cam 30 is bored eccentrically at 31 to fit over the feed cam 28, the latter being keyed at 32 to the boring bar 10. The feed cam 28 may be rotated relatively to the second cam 30, and, since the feed cam is keyed to the boring bar 10, rotation of the boring bar imparts rotary motion to the second cam. A bearing sleeve 33 fits inside the housing 16 and rotatably supports the boring bar 10.

At the inner end of the second cam 30 is provided a flange 34 fitting an inner groove 35 at the end of the bearing sleeve 33. In the same way, the feed cam 28 is provided with a flange 36 fitting an inner groove 37 in the adjacent end of the second cam 30. All three inner ends of the respective feed cam 28, the second cam 30, and the bearing sleeve 33 terminate in a common plane, and are engaged by a retaining flange 38 on a collar 39 having threaded connection at 40 with the bearing sleeve 33. Thus the flange 38 restrains the feed cam 28 and the second cam 30 from relative axial movement, as well as with respect to the bearing sleeve 33.

Relative movement between the bearing sleeve 33 and the housing 16 is prevented by reason of a retaining collar 41 having threaded connection at 42 with the bearing sleeve and engaging one end of the housing for clamping the other end of the housing against the collar 39.

A tool bar 43 is connected with the boring bar 10 through the medium of a plurality of tool bar supports 44. Figure 4 illustrates one of the supports 44 in section on the boring bar 10. This bar includes an arm 45 keyed at 46 to the boring bar. A cap section 47 coacts with the adjacent end of the arm 45 to provide a bore 48 for the reception of the boring bar, and the cap section 47 is fixedly secured to the arm by bolts 49. All the arms 44 are identical in construction.

The arm 45 of Figure 4 is provided with faces 50 and 51 respectively engaging with one face and an edge of the tool bar 43, and the opposite edge 52 of the tool bar is arranged at a slight angle to the axis of the boring bar 10, more or less in conformity with the general taper of the turbine casing. A plurality of tools 53 is secured to the tool bar 43; all these tools having identical mountings.

In the tool engaging face 54 of the tool bar 43 is fashioned two T-slots 55, which parallel the axis of the boring bar. Each tool 53 fits snugly in a housing 56 which is clamped against the face 54. Bolts 57 pass through openings in flanges 58 on the housings 56 and are threaded into nuts 59 in the T-slots 55 for fixedly securing housings. All the housings may be shifted longitudinally on the tool bar 43 to secure the desired relative spacing of the tools 53.

Two set screws 60 are threaded into each housing 56 for clamping its respective tool 53 to the tool bar 43, and an adjusting screw 61 is also threaded into the end wall of the housing for engaging the inner end of the tool. Thus the tool may easily be adjusted radially of the boring bar axis, while the set screws anchor the tool in a firm manner and the adjusting screw 61 provides an effective backing for the tool. Bolts 62 fixedly secure each arm 45 to the tool bar 43.

A jig means is provided for accurately presetting the tools 53 before the arms 45 and the tool bar 43 are placed in position on the boring bar 10. This permits the tools to be precisely set to the structural demands of a given turbine casing without the aid of the casing—simply setting up the jig in accordance with the dimensions given on the blue print and then setting the tools 53 to the jig and transferring the arms 45, the tool bar 43, and the tools 53 as a preset assembly to the boring bar 10.

Figures 9 through 12 illustrate the jig for presetting the tools 53. This jig includes a frame 64 having short supporting legs 65. A bearing 66 is provided for a short master shaft 67 corresponding to the boring bar 10. The bearings 66 are provided with removable cap sections 68 and held in place by bolts 69.

One end of the frame 64 is provided with a body 70 provided with two T-slots 71 paralleling the axis of the shaft 67. Setting stops 72 are mounted on the body 70 through the medium of bolts 73 having their heads disposed in the T-slots 71. The setting stops 72 are slotted at 74 for accommodating the bolts 73, and carriers 75 are interposed between the respective setting stops 72 and the body 70. These carriers are grooved at 76, see Figure 12, for snugly receiving the respective setting stops.

The bolts 73 extend through openings in the carrier 75, and the latter are slidably keyed to the body 70 by a key 77 paralleling the axis of the shaft 67. Figure 9 illustrates the right angular alignment of the setting stops 72 with respect to the axis of the shaft 67. All the carriers 75 may be adjusted longitudinally of the axis of the shaft 67 on the body 70 so that the desired relative spacing between the respective setting stops 72 may be secured in accordance with the dimensional requirements of the particular turbine casing to be bored.

Each of the setting stops 72 is provided with a side face 78 against which one side of a tool 53 is engaged and an end face 79 against which the end of that tool 53 is engaged. The tools 53 are carried by the tool bar 43 to which the arms 45 are connected in the same manner as with the boring bar 10 in the turbine casing. While Figure 9 shows the two arms 45 only connected with the shaft 67, all the arms are connected therewith for tool setting purposes. The arms 45 fit the shaft 67 in the same manner as the boring bar 10. Thus the arms 45, the tool bar 43, and the tool 53 are associated as an assembly in the same manner as when boring the turbine casing, with the jig employed for accurately setting the tools 53 with respect to relative spacing and with respect to their radial distances from the axis of the shaft 67.

After the tools 53 have been properly set in the jig 63, the arms 45 are disconnected from the master shaft 67 and are mounted on the boring bar 10. The turbine sections are then placed in position on the necks 14 and 15 and bolted into a unitary structure, after which the machine and the turbine casing are ready for the boring operation. The tool assembly rotates about the axis of the bearing sleeve 33, and the feeding adjustment for the tool 53 is secured through relative rotation of the feed cam 28 inside the second cam 30. The tools 53, the tool bar 43, and the arms 45 are connected as a fixed unit on the boring bar 10. The cutting action of the tools 53 is concentric with respect to the axis of the bearing sleeve 33, inside which the second cam 30 rotates, with the feed cam 28 keyed to the boring bar 10.

Means for imparting relative rotation to the feed cam 28 with respect to the second cam 30 comprises a worm gear 80 bolted at 81 to the feed cam 28. Each feed cam 28 is provided with a worm gear 80 so that the description of one will apply to both cam housings 16 and 17.

In Figure 1, a worm 82 is in mesh with the worm gear 80 and rotatably journaled in a bracket 83 fixedly secured to the second cam 30. The worm 82 is keyed to a shaft 84 which is rotatably mounted in the ears 85 of the bracket 83. To one end of the shaft 84 is keyed a ratchet wheel 86 engaged by a pawl 87, see Figure 8, slidably guided in a bore 88 in an arm 89 of a yoke 90, see Figures 2 and 3, having its arm 89 and its other arm 91 pivoted on the shaft 84.

In Figure 8, a compression spring 92 engages the pawl 87 for yieldingly urging the pawl against the ratchet wheel 86, which is keyed at 93 to the shaft 84.

Each yoke 90 has an arm 93 on which a roller 94 is mounted for engagement with a cam 95. The rollers 94 are yieldingly pressed into engagement with the respective cams 95 by tension springs 96 and connected with the second cam 30 and pin 97 secured to the yokes 90. The rollers 94 are arranged to simultaneously engage their respective cams 95 once during each rotation of the second cam 30 in the bearing sleeve 33. As the rollers 94 engage their respective cams 95, the pawl 87 imparts rotation to the ratchet wheel 86.

Since the ratchet wheel 86 is keyed to the shaft 84, rotation of the ratchet wheel imparts corresponding rotary motion to the worm 82, which in turn imparts rotation to the feed cam 28 inside the second cam 30, since the worm gear 80 is fixed to the feed cam 28 and the bracket 83, which carries the worm 82, is fixedly secured to the second cam 30. Relative rotation between the feed cam 28 and the second cam 30 imparts a slight lateral shift to the boring bar 10, which shift determines the feeding action of the tools 53. Thus the tools 53 have cutting action concentrically about the axis of the bearing sleeve 33, but once during each rotation of the second cam 30, relative rotary motion is imparted to the feed cam 28 and the second cam 30 for advancing the tool 53 a slight distance in accordance with the rotation of the worm 82.

Figures 2 and 3 illustrate the lateral shift of the boring bar 10 during the progressive relative shift between the feed cam 28 and the second cam 30. The cams 95 are so fashioned as to pivot the yokes 90 away from the stands 11 and 12, and, as the rollers 94 pass over the high points of their respective cams 95, the springs 96 pivot the yokes 90 in opposite directions. The pawls 87 yield during pivotal motion of the yokes 90 in said opposite direction so as not to impart reverse rotation to the worms 82.

Means are provided for precisely adjusting the respective cams 95. Figures 5 and 6 illustrate the adjusting means for one of the cams 95, and both adjusting means are of like construction. The cam 95 of Figure 6 includes two spaced plates 96 lying on bed flanges 97 cast integrally with the strengthening rib 98 of the stand 11. Both plates 96 are slotted at 99 for accommodating bolts 100 threaded into the bed flanges 97 for fixedly securing the plates 96 in a position on the bed flanges.

Each of the bed flanges 97 includes a flange 101 into which an adjusting screw 102 is threaded for end engagement with one of the plates 96. Thus the cam 95 may be adjusted in a horizontal plane by unloosening the bolts 100 and adjusting the screws 102. Accordingly, the cams 95 may be accurately adjusted one with the other for simultaneous coaction with the two rollers 94, in addition to varying the cam throws so as to secure precise pivotal action of the two yokes 90.

Both stands 11 and 12 are provided with base plates 103 having openings 104 for the accommodation of bolts which may be utilized to firmly anchor the two stands to a floor or other supporting structure. Each arm 45 is keyed at 105 to the tool bar 43.

The openings in the necks 14 and 15 are of sufficiently large diameters to accommodate the necessary lateral shift of the boring bar 10.

Having thus described certain embodiments of my invention in detail, it is, of course, understood that I do not desire to limit the scope thereof to the exact details set forth except insofar as those details may be defined in the appended claims.

I claim:

1. A boring machine for turbine casings comprising two spaced stands having coaxial bearings; means on said stands for supporting the turbine casings therebetween; a tool carrying boring bar extending through said bearings; eccentric means operatively connected with said boring bar to be rotated thereby and rotatably supported in said bearings for supporting the boring bar and imparting a lateral shift thereto through relative shifting of the eccentric means; relatively fixed cam means; and means acting on said relatively fixed cam means and said eccentric means for relatively shifting the latter during rotation thereof.

2. A boring machine comprising two spaced stands having coaxial bearings; means on said stands for supporting work therebetween concentrically of the axes of said bearings; a tool carrying boring bar extending through said bearings; eccentric means operatively connected with said boring bar and rotatably supported in said bearings for supporting the boring bar and imparting a lateral shift thereto through relative shifting of the eccentric means; relatively fixed cam means; and means acting on said relatively fixed cam means and said eccentric means for relatively shifting the latter during rotation thereof.

3. A boring machine comprising two spaced stands having coaxial bearings; means on said stands for supporting work therebetween concentrically of the axes of said bearings; a tool carrying boring bar extending through said bearings; eccentric means operatively connected with said boring bar and rotatably supported in said bearings for supporting the boring bar and imparting a lateral shift thereto through relative rotation of the eccentric means; relatively fixed cams; and means respectively carried by said eccentric means and actuated by said fixed cams for imparting relative rotation to said eccentric means.

4. A boring machine comprising two spaced stands having coaxial bearings; tubular necks on said stands for supporting work thereon; a tool carrying boring bar extending through said tubular necks and said bearings; relatively rotatable eccentric means respectively keyed to said boring bar and rotatably supported in said bearings for supporting the boring bar and imparting a lateral shift thereto through relative rotation of said eccentric means; coacting gear means respectively mounted on said eccentric means for imparting relative rotation thereto; and means for actuating said gear means through rotation of said eccentric means.

5. A boring machine comprising two spaced stands having coaxial bearings; means on said stands for supporting work therebetween; a tool carrying boring bar extending through said bearings; feed cams fixed to said boring bar; second sleeve-like cams fitting loosely on said feed cams and rotatably supported in said bearings; relatively fixed cams; means operatively connected with said feed cams and sleeve-like cams for restraining relative rotation between the feed cams and sleeve-like cams for connecting the cams as a unit for rotation in said bearings, but engageable with said relatively fixed cams at predetermined intervals for imparting relative rotation to the feed cams and the sleeve cams and lateral movement to said boring bar.

6. The invention described in claim 5 wherein said second mentioned means comprises gears fixed to the respective sleeve-like cams and worms meshing therewith and mounted on said feed cams; and arms having ratchet connections with said worms and arranged in the paths of said fixed cams.

7. The invention described in claim 5 wherein a tool bar is fixedly connected with said tool carrying bar; and a plurality of tools adjustably mounted on said tool bar.

8. The invention described in claim 5 wherein a plurality of arms are fixedly and detachably connected with said boring bar and extending radially therefrom; a tool bar mounted on said arms crosswise thereof; and a plurality of tool mounts adjustably mounted on said tool bar and arranged for positioning the respective tools at variable effective cutting distances from the axis of the tool bar.

9. The invention described in claim 5 wherein said first mentioned means comprise tubular necks having inside diameters proportioned to accommodate lateral shifting of said boring bar.

10. The invention described in claim 5 wherein said second mentioned means comprise worm gears fixed to said feed cams and worms meshing therewith and mounted on said sleeve-like cams; spring tensioned arms having ratchet connections with the respective worms and arranged in the paths of said relatively fixed cams; and adjusting means for said relatively fixed cams.

11. The invention described in claim 5 wherein said bearings comprise sectional housings; and wherein said first mentioned means comprise sectioned plates having split necks for supporting the work and arranged concentrically of said bearings.

NOAH E. MORRISON.